No. 632,599. Patented Sept. 5, 1899.
C. L. TRAVIS.
ROLLER GEARING.
(Application filed Apr. 19, 1899.)
(No Model.) 2 Sheets—Sheet 1.
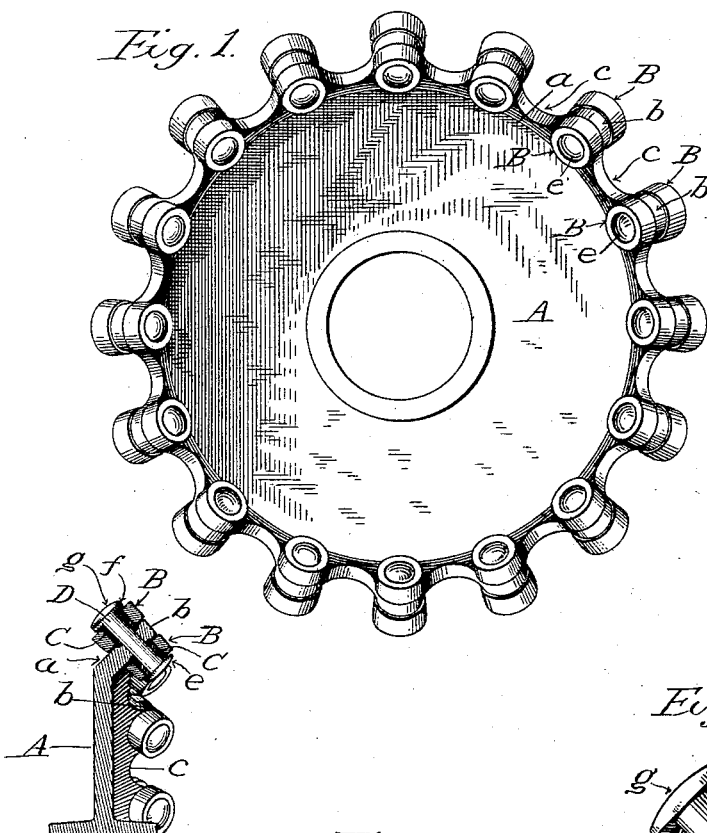
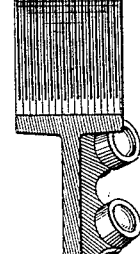
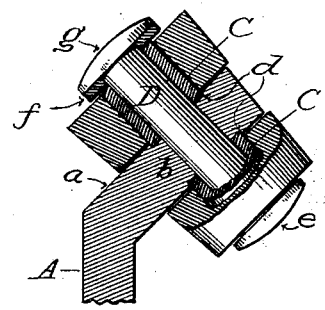
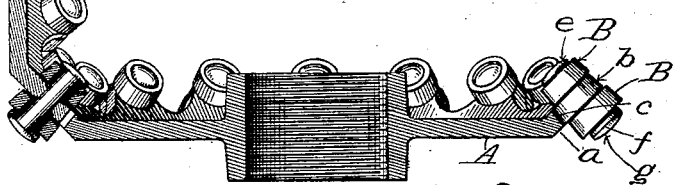
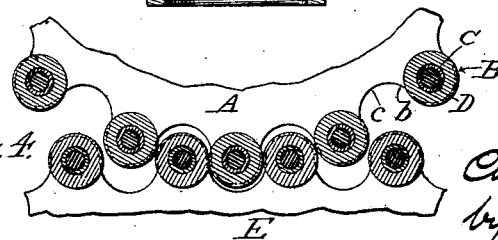
Witnesses
Inventor:
Charles L. Travis,
by Dodge Sons,
Attorneys.
THE NORRIS PETERS CO., PHOTO-LITHO., WASHINGTON, D. C.

No. 632,599. Patented Sept. 5, 1899.
C. L. TRAVIS.
ROLLER GEARING.
(Application filed Apr. 19, 1899.)

(No Model.) 2 Sheets—Sheet 2.

Witnesses
O C Birdine
D Birdine

Inventor:
Charles L. Travis,
by Dodge Sons,
Attorneys.

THE NORRIS PETERS CO., PHOTO-LITHO., WASHINGTON, D. C.

UNITED STATES PATENT OFFICE.

CHARLES L. TRAVIS, OF MINNEAPOLIS, MINNESOTA.

ROLLER-GEARING.

SPECIFICATION forming part of Letters Patent No. 632,599, dated September 5, 1899.

Application filed April 19, 1899. Serial No. 713,582. (No model.)

*To all whom it may concern:*

Be it known that I, CHARLES L. TRAVIS, a citizen of the United States, residing at Minneapolis, in the county of Hennepin and State of Minnesota, have invented certain new and useful Improvements in Roller-Gearing, of which the following is a specification.

My invention pertains to gearing, and particularly to such as employs antifriction-rollers to constitute the engaging or intermeshing members or to take the place of the ordinary rigid teeth.

The invention may be embodied in bevel-gearing, in spur-gearing, or in racks and pinions, as occasion requires, and the following description and claims are to be read with this understanding, spur-gearing including both internal and external gears.

As the more immediate purpose of the present invention is to permit the employment of rollers in lieu of rigid teeth in both of two intermeshing bevel gears or pinions, I have illustrated this construction in the drawings; but I have also shown the invention as applied to a spur-wheel and rack, and I have also shown the roller-wheel acting in conjunction with a rigid-toothed rack and with a rigid-toothed wheel.

In the drawings, Figure 1 is a face elevation of a bevel gear or pinion embodying my invention; Fig. 2, a sectional view showing two such wheels in operative relation or engagement; Fig. 3, an enlarged view showing the construction and mode of mounting the rollers, portions being broken away to better show the arrangement and construction of parts; Fig. 4, a sectional view illustrating the invention as applied to a spur-wheel and rack; Fig. 5, a similar view showing the rack with rigid teeth instead of rollers; Fig. 6, a sectional view similar to Fig. 2, but showing one of the bevel-wheels with rigid teeth.

Prior to my invention gearing has been made with rigid teeth, and in some cases with rollers to take the place of such rigid teeth; but in the latter case the rollers have been applied usually to but one of two coacting wheels or to the rack alone or the pinion alone, in the case of a rack and pinion. Latterly attempts have been made to apply rollers to two coacting wheels rotating in intersecting planes, this being accomplished by mounting the rollers upon axes parallel in each wheel with the axis of such wheel and giving to the rollers a curved form in the direction of their length. Other forms of roller-teeth have also been proposed. My invention aims to maintain the general form of the wheels or wheel and rack, yet to apply to each the rollers and to cause the rollers of one to bear against and to coact with those of the other member. Important points in the construction of gearing of this class are the attainment and maintenance of perfect contact between the rollers of respective teeth throughout their length or in the direction of their axes of rotation, provision for ready and accurate adjustment of the rollers in the event of their being thrown in any degree out of true position in assembling or after the parts are assembled, prevention of any disturbance in the proper relative adjustment of the rollers in the act of securing them in place, and the avoidance of any necessity for great accuracy in the drilling of the rivet-holes and bushings. So, too, it is highly important that the construction be such that the pressure on one end or section of the roller-tooth be counterbalanced by that on the other end or section, so that if, for any reason, there be the slightest tendency of the rollers to bear unequally at one end this counterbalancing effect shall bring them into true line-bearing from end to end.

Referring now to the drawings and first to Figs. 1, 2, and 3 thereof, A indicates the body or disk and hub portion of a wheel, having a peripheral flange *a*, which is of a scalloped form or is provided with alternate projections or ears *b* and depressions or recesses *c*, the latter advisably of greater width than the intervening projections or ears. The flange *a* will, in the case of spur-wheels or wheels designed to coact with another wheel or rack moving in the same or parallel plane, be in the same plane with the disk or body portion on which it is formed. In other words, the scalloped edge or alternate projections and depressions may be simply the outer edge or periphery of the disk in the case of spur-gearing, but for bevel gears or wheels designed to impart motion to another member moving in an intersecting plane the flange *a* will be set at an appropriate angle to the body or disk A, as shown in Figs. 2 and 3. The angle at which the flange stands relatively to the body or disk portion will of course vary according to the relative diameters of the two coacting wheels. In Fig. 2 two such wheels are shown of equal diameter and their flanges *a* are accordingly set at an angle of forty-five degrees relatively to the body or disk portions.

The ears or projections *b* are designed to carry the supporting-axles of a series of rollers, which rollers will in the case of spur-gearing and racks be of cylindrical form, but in the case of bevel-gearing will be conical or tapering, the taper being such that straight lines contacting with their surfaces and running in the general direction of their axes will all meet in the point of intersection of the axes of two coöperating wheels. B B indicate the rollers, which are made each in two sections, one on each side of the flange *a* or the ear *b* thereof. The axles of the rollers B are formed by short tubes or bushings C, similarly made in two sections and placed on opposite sides of the supporting or carrying ears *b*. To firmly secure these bushings or bearing-sleeves in their proper positions and to guard against any shifting or movement thereof, either laterally or longitudinally, the ears are drilled or bored to receive a fastening device, rivet, or bolt D, and both faces of said ears are counterbored concentrically with the bolt or rivet hole to receive the inner ends of the sleeves or bushings C, as best shown in Fig. 3, though also seen in Figs. 2 and 6. The sleeves or bushings C are made of a length sufficient to enter counterbored seats or sockets *d* and to project from the faces of the ears or projections *b* a distance slightly greater than the axial measurement of the rollers B. The sleeves or bushings being placed in position and the rollers B being mounted thereon, the several parts are firmly and accurately secured and retained in place by means of a rivet D or its equivalent, a bolt or like fastening, which is passed through the sleeves and the intervening ear *b* and properly secured in place. In practice it is found convenient and expedient to employ rivets, preferably of steel, having at one end a reasonably large and well-formed head *e* and of such length as to permit the application of a washer *f* to its protruding end and to leave metal sufficient for the formation above or outside of said washer of a second head *g*. The rollers and the sleeves or bushings are by preference made of hardened or tempered steel, while the rivet is made of mild steel or other metal or an alloy capable of being properly headed down, as explained. By the construction just described the sleeves *f* are held very firmly in place and are absolutely precluded from shifting or tipping in any direction. Hence if once properly set they will accurately locate and maintain in position the rollers B.

It will be observed by reference to the several figures that the rollers B project beyond the edges or periphery of their supporting or carrying ears *b*, and it will also be noted that the spaces *c* between said ears are of greater width than are the ears themselves, measured in the planes of the axes of the rollers. The purpose of this relatively greater width of space is to preclude contact of the ears or rollers of one wheel with the ears of the other wheel or in the case of a rack and pinion to prevent contact with the ears of the rack or the pinion.

As above explained and as is indicated in Fig. 2, the rollers B B are of tapering form, and the taper is such that lines drawn from the point of intersection of the axes of the two coacting wheels will lie parallel or in contact with the surfaces of the rollers in the direction of their length. The rollers of the two wheels will therefore come together in the same relation and act upon each other in the same way substantially as do the rigid teeth of ordinary bevel-gears, except that by reason of their ability to turn about their axes the rollers will substitute rolling for sliding friction, and thus greatly reduce the frictional resistance to rotation of the wheels.

By the construction just explained I am enabled to employ roller-teeth or coacting rollers in lieu of teeth in two bevel-wheels or wheels arranged to rotate in intersecting planes; but it is essential to this result that spaces, such as the depressions or spaces *c*, be left between the ears or supports by which the rollers are carried, as otherwise the flange *a* of one wheel would preclude its intermeshing with the other wheel.

In Fig. 4 I have represented the ears or projections *b* as extending outward in the same plane with the body or disk A, the rollers and their bushings and fastenings being shown in section, as otherwise the bushings would be hidden by the heads of the fastenings. It will be seen upon reference to this figure that except for the inclination or angular arrangement of the flange or the scalloped periphery of the wheel it is the same in this as in the preceding figures, and so, too, of the rack E with which said wheel is shown coacting.

Figure 5:
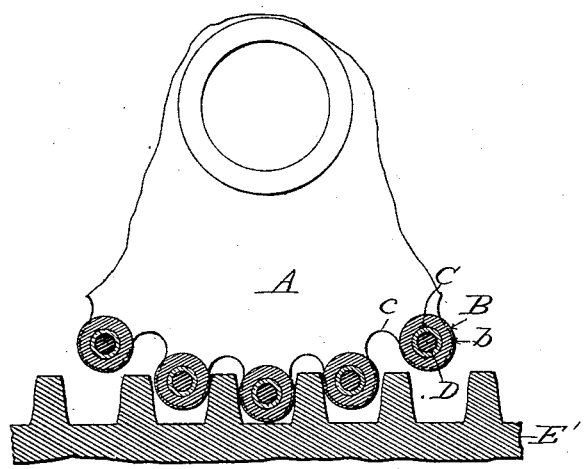
Fig. 5 is the same as Fig. 4, except that the rack E' is represented as having rigid teeth instead of rollers. The teeth in such case should be rather longer and more slender than are the teeth of racks designed for use with ordinary toothed gears.
Figure 6:
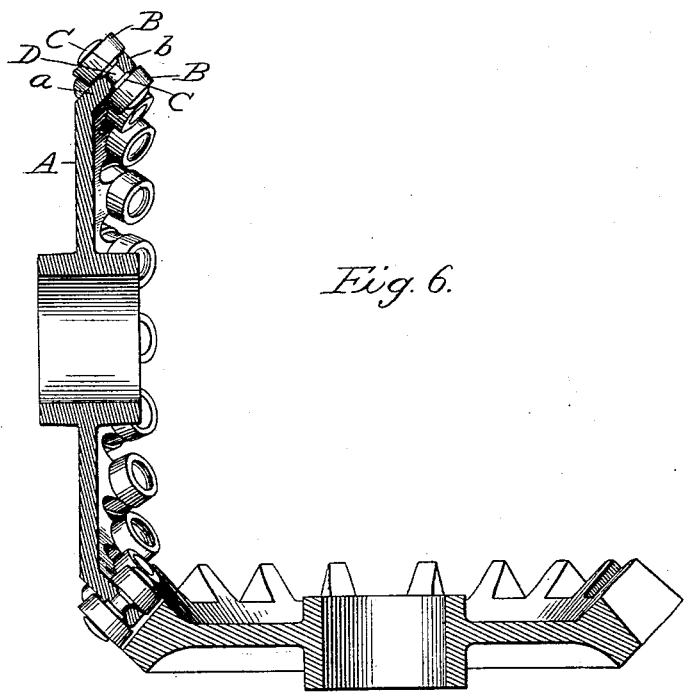
Fig. 6 represents the roller bevel-pinion coacting with a rigid-toothed bevel-pinion, the teeth being spaced somewhat wider and made longer and more slender than the teeth of ordinary bevel-gears to adapt them the better to coöperate with the roller gear or pinion.

It will be observed that under the several embodiments of the invention here represented all tendency of the axles to twist, cant, or tip in any direction is counteracted, first, by the seating of the ends of the sleeves in the the counterbored faces of the supporting or carrying ears and the clamping of them in such position by the rivets or fastenings D, and, second, by the equal pressure applied to the rollers on opposite sides of each ear or carrying projection *b*.

The construction above set forth is simple, light, and cheap, and affords great facilities for drilling and assembling the parts and for adjusting them in the event that any ear be thrown slightly out of position or any hole be bored in the least degree out of proper inclination.

The hub may be tapped or threaded or otherwise adapted to be secured upon an axle-shaft or other member.

In the manufacture of wheels of this class the drilling of the rivet-holes and the boring of the counter-seats for the sleeves or bushings may be done by one and the same tool to advantage. The proper location and spacing of the counter-seats for the bushings require great accuracy, to the end that the sleeves or bushings when seated therein shall be at the precise distance from one another and from the axis of the wheel necessary to close-fitting of the gear-teeth or rollers and to prevent lost motion or backlash. The bushings being thus accurately located and being held by the solid surrounding metal cannot be displaced laterally. If, therefore, the hole through the bushing or the rivet-hole in line with the interior opening of the bushing be not accurately located with reference to the circumference of the counter-seat in which the bushing is placed, such inaccuracy is wholly immaterial and may be completely disregarded. So, too, the bushings being produced by automatic machines and gaged to absolute uniformity of length, the rollers being similarly produced and the counter-seats bored by stop mechanism to precise and uniform depth, it follows that the rivets may be headed down without great care, but with the certainty that the bushings will be secured with the utmost accuracy in their proper positions and without danger or liability of causing the rivet-heads or the washers thereunder to bind or bear upon the rollers. The bushings being of tempered metal and of relatively broad base or large diameter cannot be rocked or tipped in their seats in a manner to bind or cramp the rollers, as might be done in the case of a simple rivet or through-pin soft enough to be headed or riveted down.

Owing to the fact that there is a roller on each side of the web or flange and that the pressure is brought upon both sides simultaneously, if by any possibility one of the ears should be thrown very slightly out of its true position the strain thus brought upon the rollers would tend to spring or twist the ear back to its proper position, the play or movement being, however, exceedingly slight in any case. If in the course of manufacture, during or after assembling of the parts by reason of dropping the gear or through an inaccurate stroke of the riveting-hammer or any like cause, an ear be bent or thrown out of position, it may readily be brought back to its true position by placing it in the jig or apparatus in which it was originally drilled or counterbored, or this may be done in any suitable appliance made for the purpose or even by the light stroke of a hammer or by force applied through a wrench or like tool in the hands of a skillful workman. The pressure and strain being brought equally on opposite sides of the web or flange, there is practically no tendency, so long as the rollers properly bear against one another, to throw the flange or web or the ears thereof out of their proper plane and position, and should this happen from any cause the natural tendency is by reason of the strain on opposite sides and on a common through pin or rivet to restore the parts to their true and proper positions.

It will be seen, particularly upon referring to Fig. 3, that by reason of the employment of the sleeves which constitute in fact, the axles for the rollers I am enabled to use relatively large and strong axles, while by employment of the rivets of smaller diameter passing through the sleeves or bushings I avoid unduly weakening the ears and I retain a sufficient body of metal therein to resist the tendency of the metal to tear out under the great strain brought upon the roller-teeth. In other words, while employing a relatively large and strong tubular axle for each roller or roller-section the holes passing through the web or flange of the wheel or through the ears thereof are comparatively small. The tensile strength of the rivet being great and there being but little longitudinal strain brought thereon the use of small rivets is permissible when the bushings are provided.

I am aware that it has been proposed to construct a sprocket-wheel in the form of a disk or circular body having on its opposite faces circumferentially-grooved rollers connected by a through-pin passing through the wheel or disk parallel with its axis, the grooved rollers being supported upon ball-bearings. Such a construction I do not claim, nor is it practicable for the purpose of intermeshing gear-wheels, for the reason, among others, that the rim or periphery of the wheel is not of such form as to permit two such wheels to act in conjunction.

It is important that the rollers be either truly cylindrical or truly conical, or, in other words, that their outer faces form straight lines in the general direction of their axes, to the end that there may be a complete line contact from end to end.

Having thus described my invention, what I claim is—

1. A gear-wheel consisting of a disk or body, a series of stationary axles carried at or near the periphery thereof, and rollers carried by said axles in pairs, one roller of each pair on one side of the disk or body and the other roller on the other side thereof.

2. In a gear-wheel, the combination of a disk or body; a series of axles projecting from opposite faces thereof at or near its periphery;

and straight-faced rollers applied to said axles on opposite sides of the disk or body.

3. In a gear-wheel, the combination of a body having its periphery provided with alternate ears or projections and recesses or depressions adapted to receive corresponding ears or projections; and a series of rollers carried in pairs by the ears or projections, the rollers of each pair being on opposite sides of the carrying ear or projection.

4. The herein-described gear-wheel, comprising a body A; a series of projections or ears $b$; a series of depressions $c$ alternating and corresponding in form with the ears $b$; axles supported by the ears $b$ and projecting on opposite sides thereof; and rollers B applied to said axles.

5. In a gear-wheel the combination of a body or disk provided with peripheral ears or projections $b$; rivets or fastenings D passing through the ears $b$ and projecting on opposite sides thereof; bushings encircling said fastenings and secured thereby to the ears $b$; and rollers encircling the bushings substantially as and for the purpose set forth.

6. In combination with disk or body A having counterbored ears or projections $b$; sleeves or bushings having their inner ends seated in the counterbores of the ears; rollers encircling said sleeves; and fastenings passing through the sleeves and serving to retain said sleeves and the rollers in position.

7. The combination substantially as herein set forth, of two coacting gear members, each provided with projecting ears and intervening recesses, said ears being provided on both outer faces with rollers, substantially as shown and described.

8. A bevel-gear consisting of a body or disk A having a peripheral flange at an angle to the plane of rotation, and provided with alternate projections and depressions; and sectional conical rollers carried by and upon opposite sides of said projections and having their axes and their longitudinal surfaces radial to a common point or center in the axial line of the wheel.

9. The combination of two bevel gear-wheels each comprising a disk or body having a peripheral flange at an angle to said body formed, with alternate projections and depressions, each wheel provided with a series of rollers arranged in pairs, the rollers of the respective pairs being carried upon opposite sides or faces of the respective peripheral projections, and having a common center from which their axes radiate, substantially as set forth.

10. In a gear-wheel, the combination of a main body or disk provided on opposite faces with short axles, each consisting of a tubular sleeve, each sleeve on one side being in alinement with another on the opposite side; and a fastening passing through the bushings and the web or body of the wheel, and bearing upon the ends of the bushings.

11. The combination of two coacting wheels, each provided with peripheral ears or projections, and with lateral rollers on both outside faces of said ears, whereby pressure brought by one wheel upon the other tends to force or to hold the rollers of the coacting wheels in engagement throughout their length.

In witness whereof I hereunto set my hand in the presence of two witnesses.

CHARLES L. TRAVIS.

Witnesses:
L. J. DAVIDS,
CHAS. R. CHUTE.